US008407259B2

(12) United States Patent
Connell

(10) Patent No.: US 8,407,259 B2
(45) Date of Patent: Mar. 26, 2013

(54) SYSTEM AND METHOD FOR STORING AND RETRIEVING DATA FROM STORAGE

(75) Inventor: Robert Andrew Connell, Ottawa (CA)

(73) Assignee: Research In Motion Limited, Waterloo (CA)

( * ) Notice: Subject to any disclaimer, the term of this patent is extended or adjusted under 35 U.S.C. 154(b) by 232 days.

(21) Appl. No.: 12/901,160

(22) Filed: Oct. 8, 2010

(65) Prior Publication Data
US 2011/0093495 A1 Apr. 21, 2011

Related U.S. Application Data

(60) Provisional application No. 61/252,342, filed on Oct. 16, 2009.

(51) Int. Cl.
*G06F 7/00* (2006.01)
*G06F 17/30* (2006.01)
(52) U.S. Cl. ......... 707/796; 707/795; 707/797; 707/741
(58) Field of Classification Search .................. 707/795, 707/596, 697, 741
See application file for complete search history.

(56) References Cited

U.S. PATENT DOCUMENTS

| | | | |
|---|---|---|---|
| 5,870,739 | A | 2/1999 | Davis, III et al. |
| 6,535,869 | B1 * | 3/2003 | Housel, III ................. 707/691 |
| 2003/0078915 | A1 | 4/2003 | Chaudhuri et al. |
| 2003/0123397 | A1 * | 7/2003 | Lee et al. ................... 370/256 |
| 2003/0204513 | A1 * | 10/2003 | Bumbulis ................... 707/100 |
| 2005/0102255 | A1 * | 5/2005 | Bultman ........................ 707/1 |
| 2006/0161545 | A1 * | 7/2006 | Pura .............................. 707/7 |
| 2007/0038626 | A1 * | 2/2007 | Waters et al. ................... 707/6 |
| 2008/0133574 | A1 * | 6/2008 | Fukushima et al. ......... 707/102 |
| 2011/0022819 | A1 * | 1/2011 | Post et al. .................... 711/207 |

FOREIGN PATENT DOCUMENTS
WO WO 92/15954 A1 9/1992

OTHER PUBLICATIONS

Extendible Hashing = The Best of Hashing and Tries; http://csf11.acs.uwosh.edu/cs321/slides/oct-26.pdf; retrieved from internet at least as early as Dec. 7, 2009.
Google Search; www.google.com; screenshot taken Dec. 3, 2009.
Suffix Trees and Suffix Arrays; http://www.csie.ncu.edu.tw/~chia/Course/IR/IR1999/PAT.ppt; retrieved from internet at least as early as Dec. 7, 2009.
Baeza-Yates, R. et al.; "Modern Information Retrieval"; Chapter 8, Indexing and Searching; Jan. 1, 1999; pp. 191 to 228; ACM Press; ISBN 978-0-201-39829-8.
Zubrzycki, W.; Search Report from corresponding European Application No. 10187044.2; search completed Apr. 5, 2011.

* cited by examiner

*Primary Examiner* — Shew-Fen Lin
(74) *Attorney, Agent, or Firm* — Brett J. Slaney; Blake, Cassels & Graydon LLP

(57) ABSTRACT

A system and method are provided which avoid the storage of multiple objects for a single entry in memory, in particular where the entry needs to be stored at least once anyway, a reusable data structure can be implemented which allows both easy and efficient use/reuse of Patricia tree components that are already in use. The data structure can be an integer built from a combination (e.g. concatenation) of a location where the corresponding string has been stored in memory, an offset for finding the word within the string, and a length for extracting all characters from the string that make up the word. Another data component can also be added, which can encode any other feature associated with the word such as a bias level for sorting multiple search results.

26 Claims, 17 Drawing Sheets

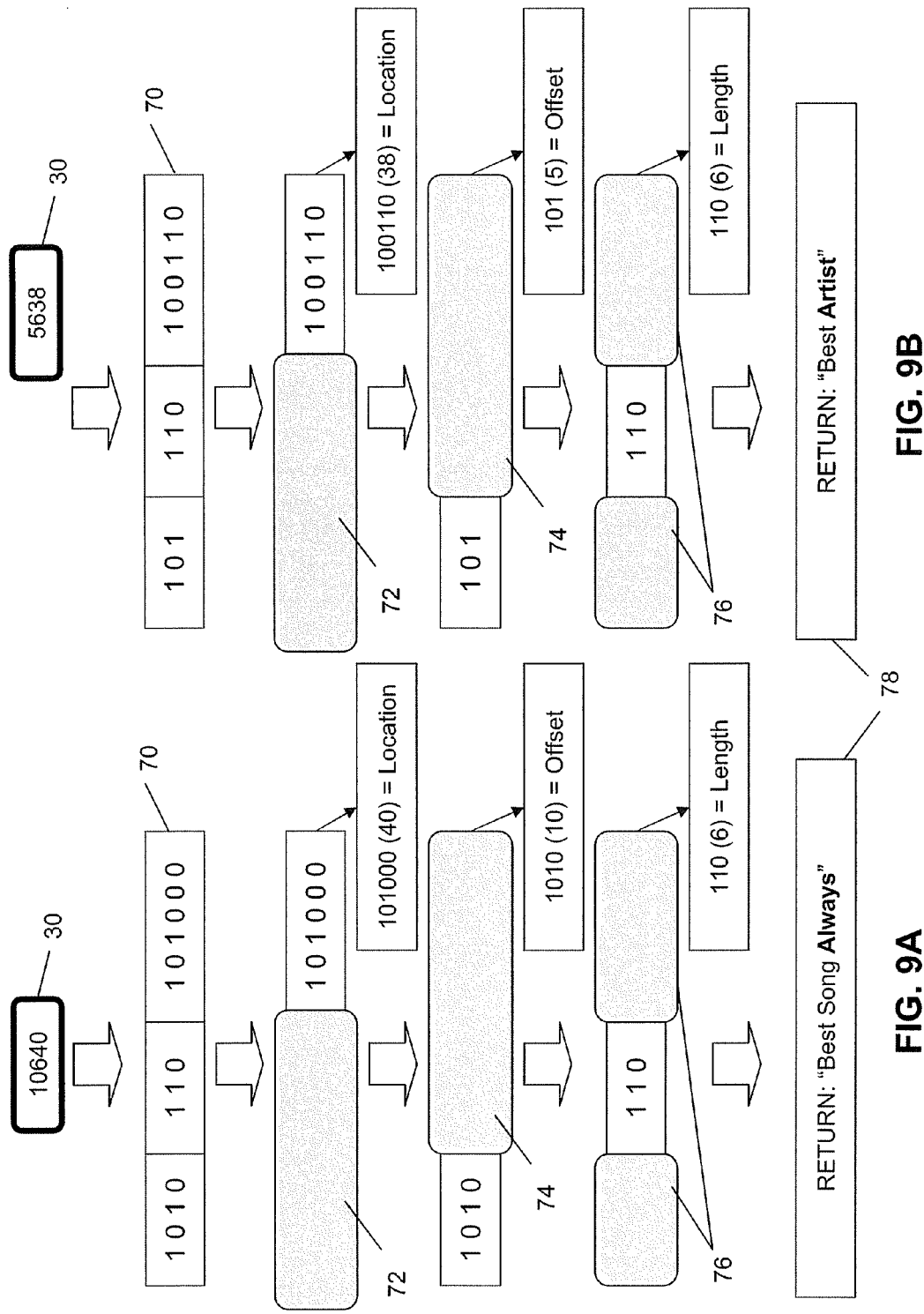

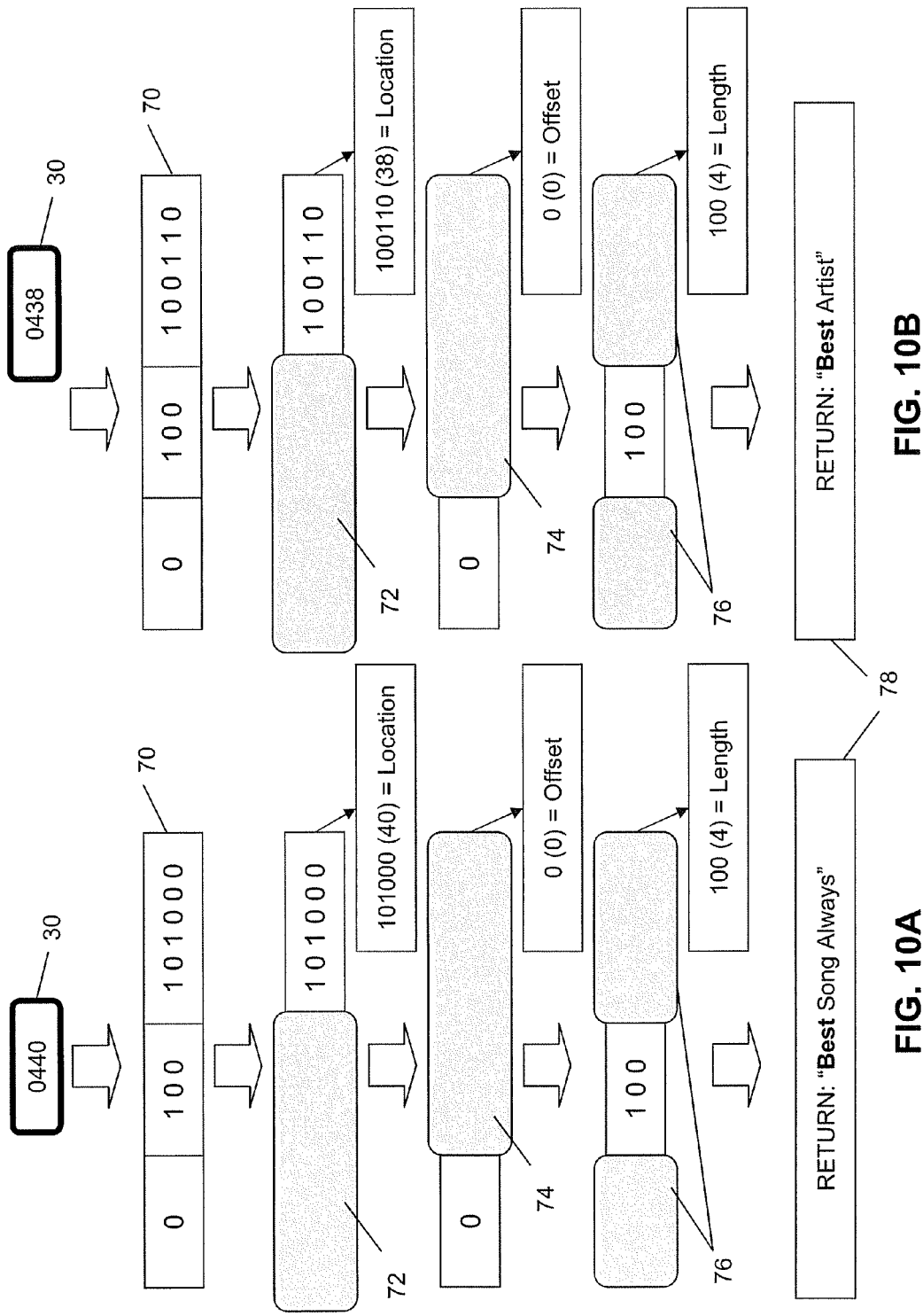

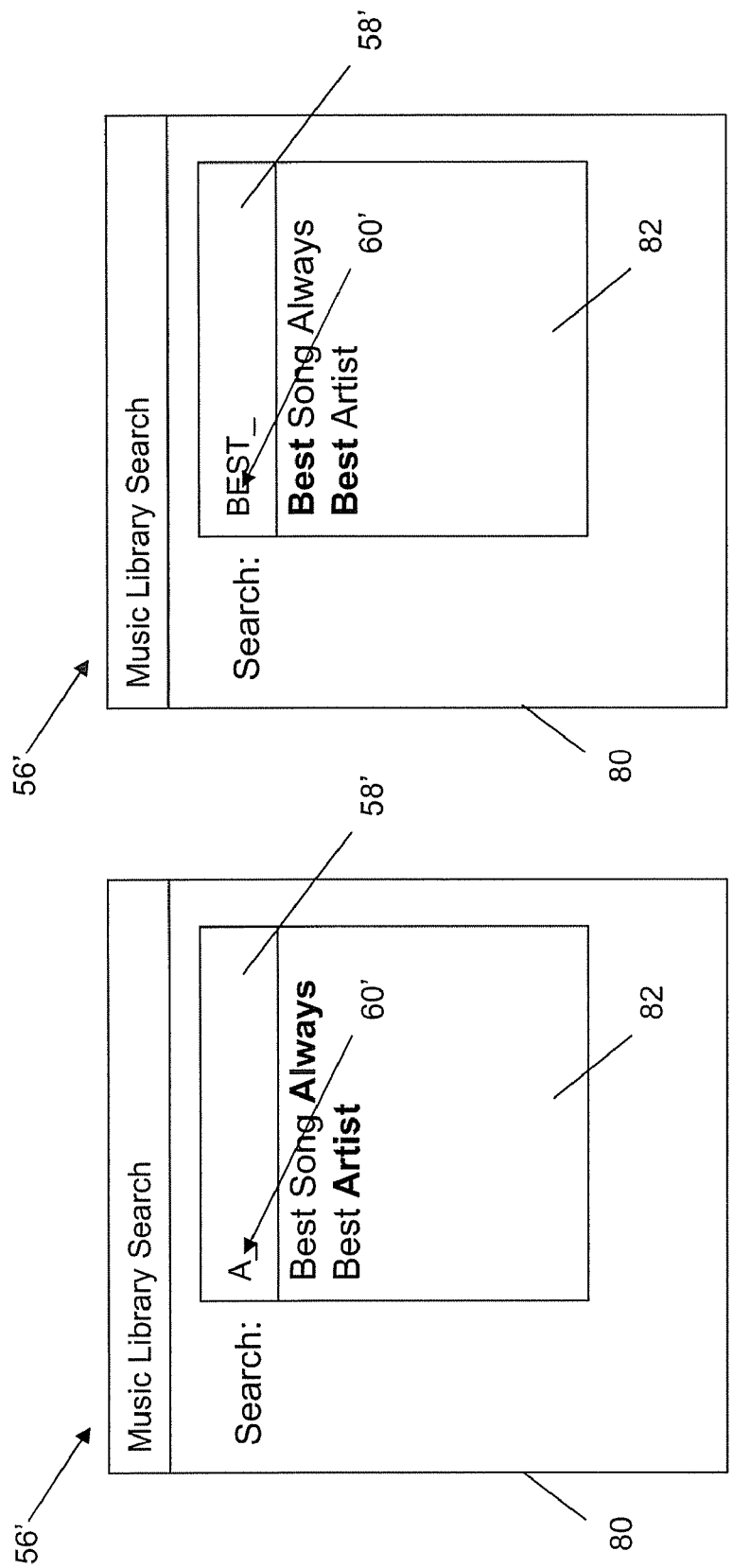

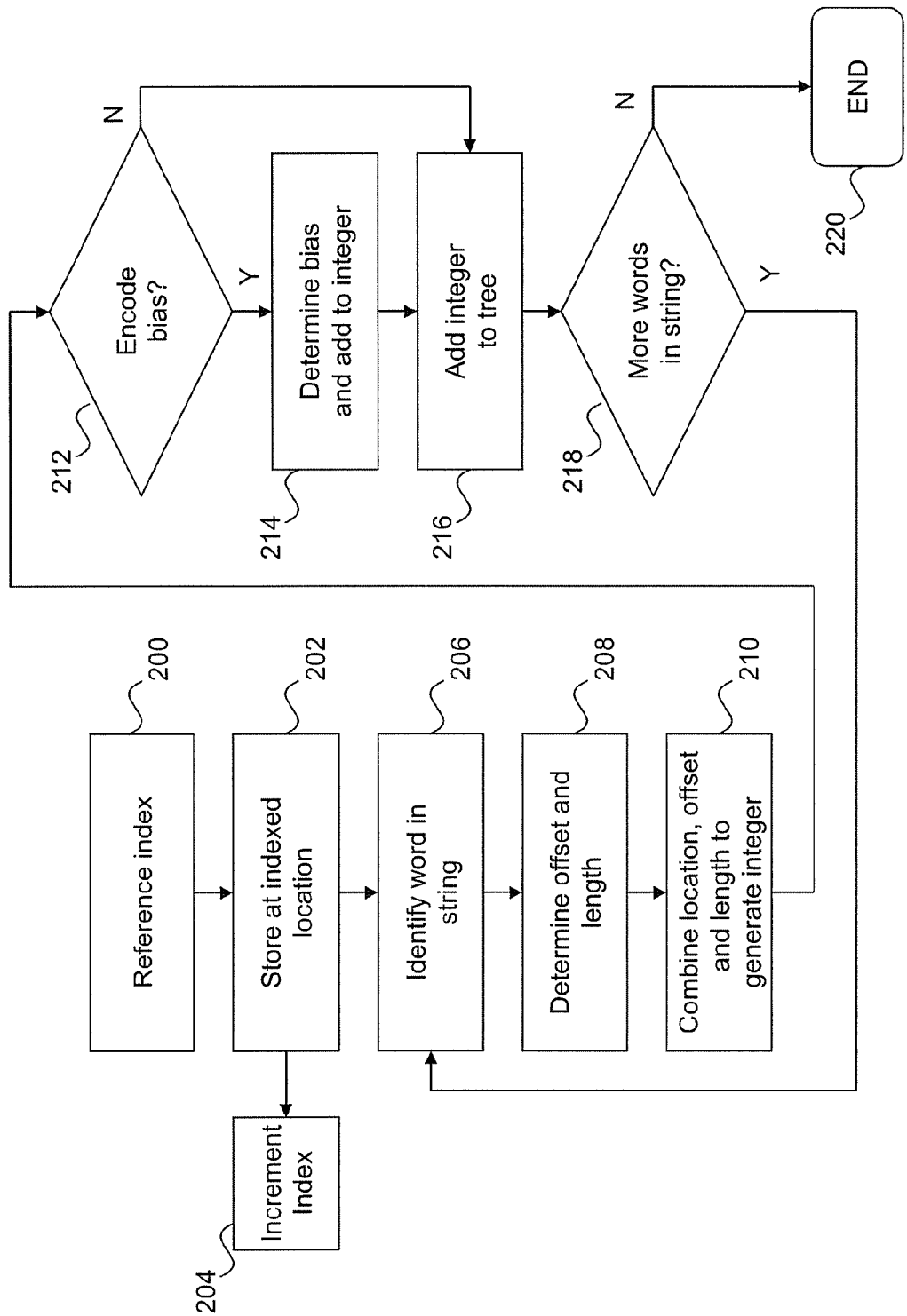

SYSTEM AND METHOD FOR STORING AND RETRIEVING DATA FROM STORAGE

This application claims priority from U.S. Provisional Application No. 61/252,342, filed on Oct. 16, 2009, the contents of which are incorporated herein by reference.

TECHNICAL FIELD

The following relates to systems and methods for storing and retrieving data from storage.

BACKGROUND

Radix or Patricia trees (tries) are well known specialized data structures based on the tree (trie) that is used to store a set of strings. In contrast with a regular tree, the edges of a Patricia tree are labelled with sequences of characters rather than with single characters. These can be strings of characters, bit strings such as integers, or generally arbitrary sequences of objects in lexicographical order. Structurally, the radix or Patricia tree can be understood as a space-optimized tree where each node having only one child is merged with its child. The result is that every internal node has at least two children. Unlike in regular trees, edges can be labelled with sequences of characters as well as single characters. This typically makes a Patricia tree more efficient for small sets and for sets of strings that share long prefixes.

Patricia trees are commonly used in the searching for and retrieving data in memory, e.g. for performing a look-up function. Patricia trees are sometimes used in Java-based implementations. However, it is generally understood that the efficiency of Patricia trees can degrade as the set being stored becomes large. When storing an ever increasing number of items, the number of objects, e.g. Java objects can become burdensome, which can cause performance degradation, in particular on devices with constrained memory and computing resources.

BRIEF DESCRIPTION OF THE DRAWINGS

Embodiments will now be described by way of example only with reference to the appended drawings wherein:

FIGS. 9A and 9B are flow diagrams illustrating masking operations on the integers found in the search shown in FIG. 7A.

FIGS. 10A and 10B are flow diagrams illustrating masking operations on the integers found in the search shown in FIG. 7B.

FIGS. 11A and 11B are example screen shots illustrating graphical user interfaces (GUIs) for displaying search results.

FIG. 13 is a flow diagram illustrating an example set of computer executable instructions for generating an integer according to the structure shown in FIG. 4.

DETAILED DESCRIPTION OF THE DRAWINGS

It has been realized that when using Patricia trees for searching and retrieval operations, in particular in the Java environment, an excessive number of objects are created, which can cause performance degradation. For example, when storing a string that includes multiple keywords within the string which are searchable, an object needs to be stored for each keyword. To avoid the storage of multiple objects for a single entry, in particular where the entry needs to be stored at least once anyway, a reusable data structure can be implemented which allows both easy and efficient use/reuse of Patricia tree components that are already in use. In this way, only one item needs to be created which can be referenced to retrieve constituent sub-objects. For example, when storing a string comprising a plurality of words, only the string needs to be stored rather than the string plus each word. As will be explained in greater detail below, not only does the data structure enable both efficient storage and retrieval of data, but additional features can be encoded into the data structure to bring further enhancements and efficiencies to the process.

Figure 1:
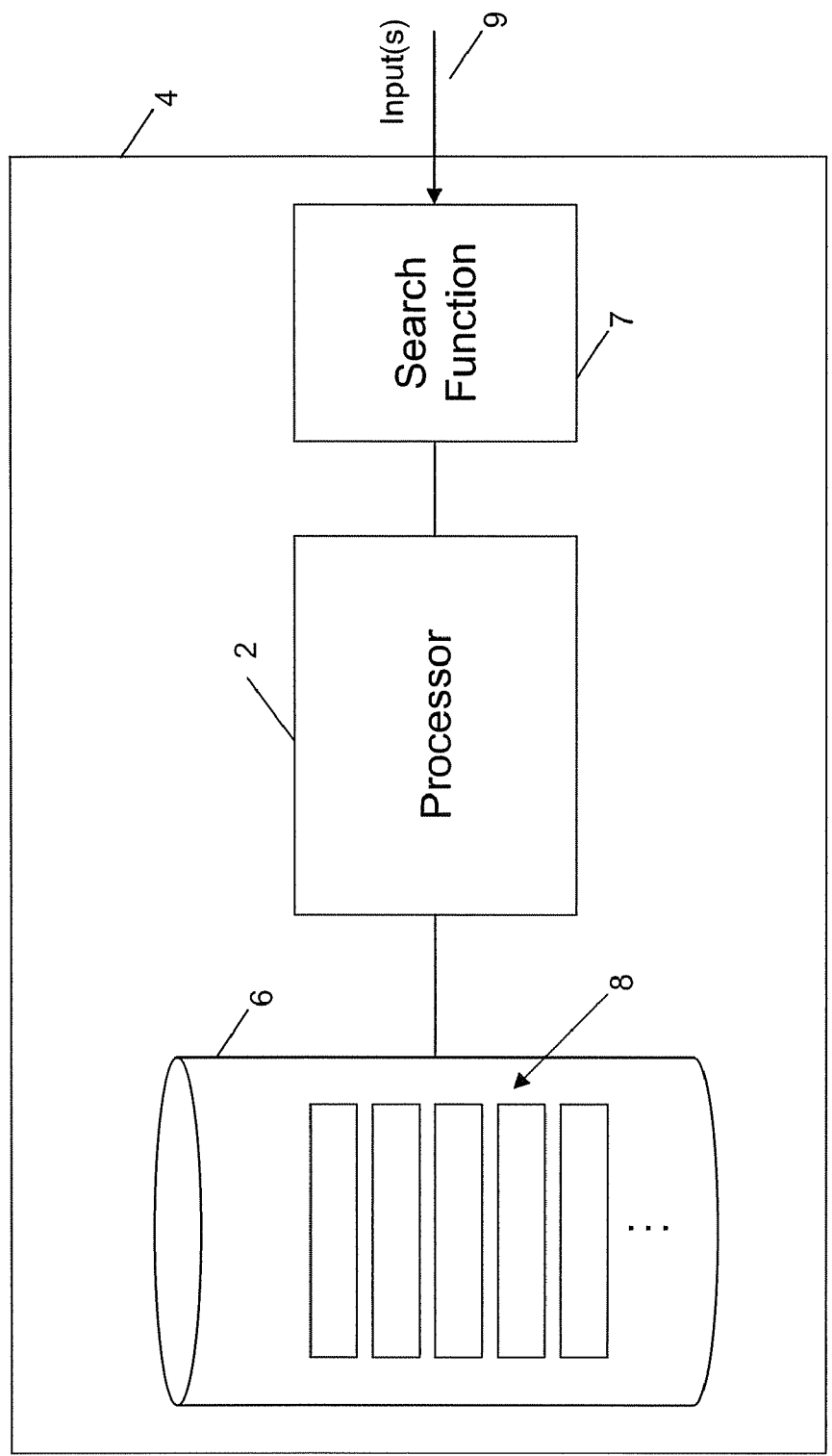
FIG. 1 is a block diagram of an example computing device.

Turning now to the figures, FIG. 1 illustrates in general a processor 2 in a computing device 4, which is used to access a data storage or memory 6 containing one or more items 8. The items 8 can be stored using the data structure to be described herein such that a search function 7 (e.g. a UI look-up component) can later retrieve one or more of the items 8 upon conducting a search according to appropriate inputs 9 (e.g. user input).

The following principles can be applied to any computing device configured to enable the storage and retrieval of data, e.g. using a look-up, including both desktop computing devices and mobile devices. Examples of applicable mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities. For the sake of illustration, the following examples will be provided in the context of mobile devices, referred to commonly by numeral 10 as shown in FIG. 2, which often have constrained computing and storage resources.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a smart phone, data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system to the mobile device 10 (not shown).

Figure 2:
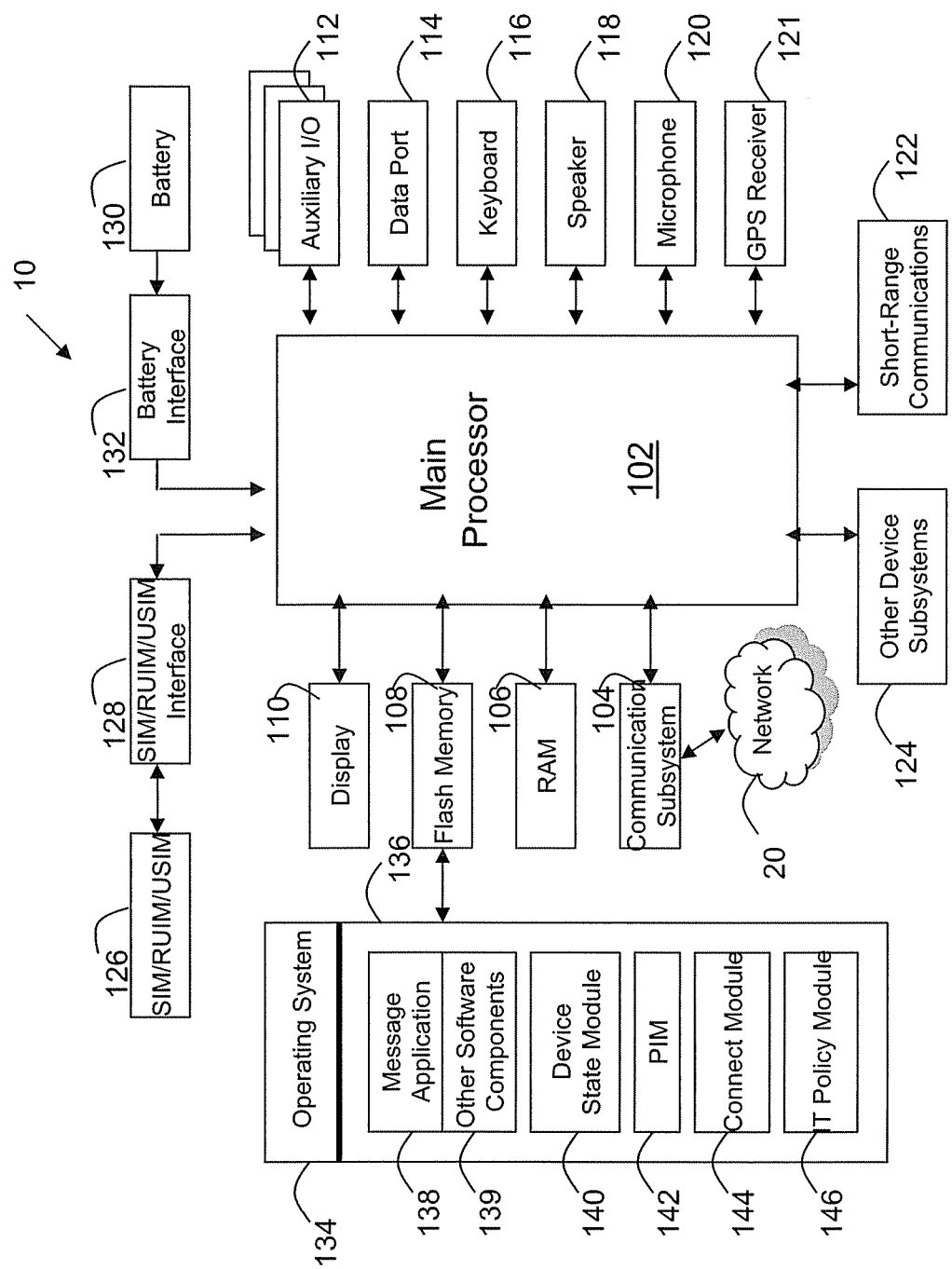
FIG. 2 is a block diagram of an example mobile device.
Figure 3:
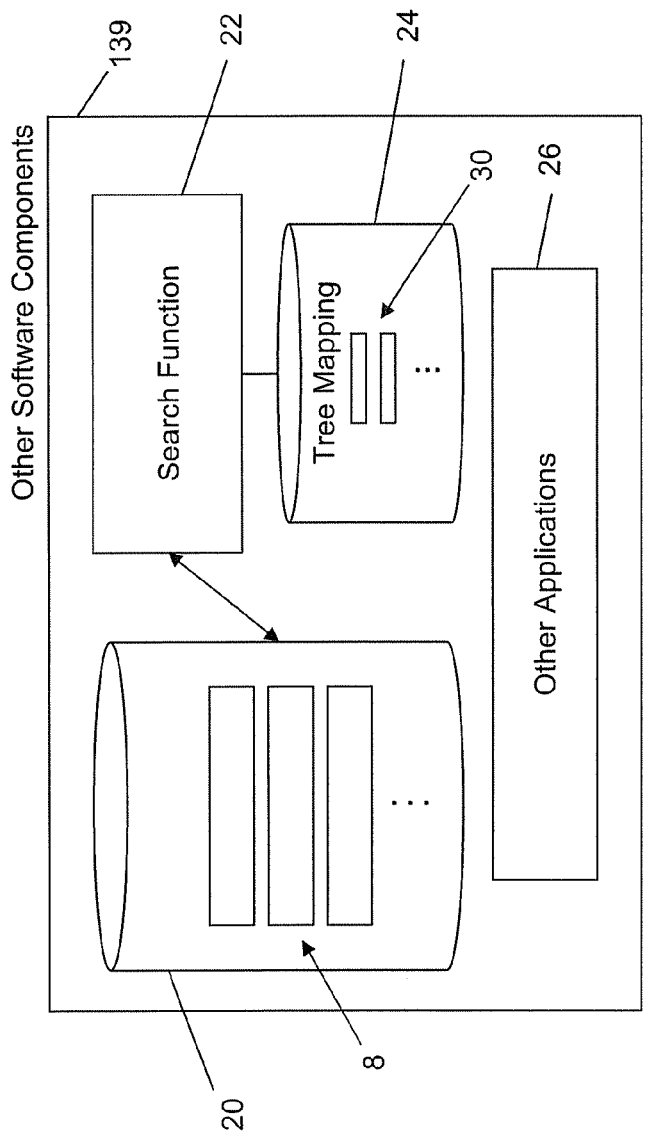
FIG. 3 is a block diagram of one configuration for the other software components shown in FIG. 2.

An example configuration for a mobile device 10 is shown in FIGS. 2 and 3. Referring first to FIG. 2, shown therein is a block diagram of an embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this exemplary embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. The short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

The main processor 102 can also control a backlight 36 for conserving battery life when the mobile device 10 is locked or otherwise not in use (e.g. in a holster). The backlight 36 can be used to illuminate the display 110 when the mobile device 10 is being used. The backlight 36 can be associated with an idle timer 34 such that an idle time can be tracked and if it reaches or exceeds a certain predetermined threshold (or user definable threshold), the backlight 36 is turned off. As will be explained below, the idle timer 34 can also be used to provide a current idle time to the main processor 102 for other uses such as to determine inactivity of the user. The main processor 102 may also utilize data provided by an orientation sensor 35. The orientation sensor 35 may comprise an inclinometer or other sensor capable of determining the orientation of the mobile device 10 with respect to a datum.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 3 shows an example of the other software applications and components 139 that may be stored on and used with the mobile device 10. In this example, the other software components 139 include a search function 22 for finding items 8 stored in a container or data store or memory 20. The search function 22 includes or otherwise has access to a tree mapping 24, which in this example is a Patricia tree stored in memory which contains one or more unique integers 30 corresponding to components of the items 8 and which encode the location for the corresponding item 8 in memory 20 to enable the search function 22 to find and access the item 8 (and thus the component within the item 8). Also shown in FIG. 3 are other applications 26 which may generally represent any other application or software component that has either been pre-installed on the mobile device 10 or was user-installed.

It will be appreciated that the computing device 4 shown herein may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by, for example, the processor 2, search function 7 or both. Any such computer storage media may be part of the computing device 4, or accessible or connectable thereto.

Figure 4:
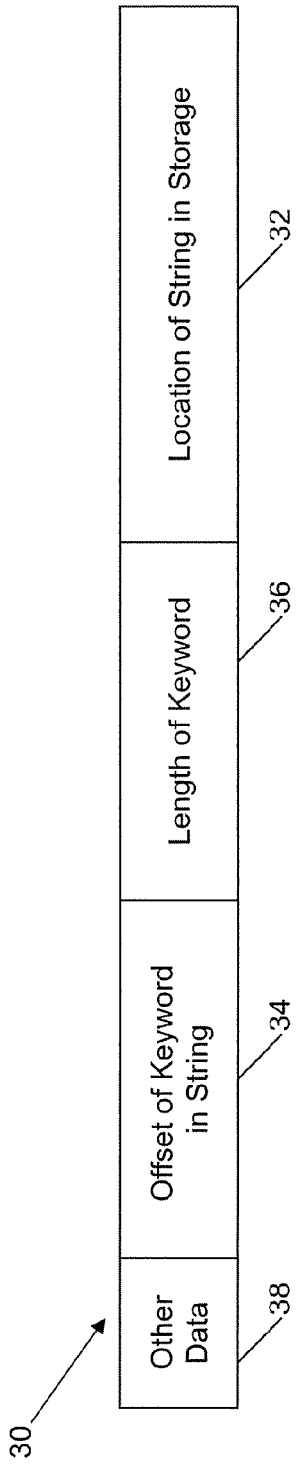
FIG. 4 is a schematic diagram illustrating values encoded in an integer corresponding to an attribute for an object shown in FIG. 3.

FIG. 4 illustrates an example structure for the integers 30 stored in the tree mapping 24. Each integer 30 represents a component of one of the items 8 stored in memory 20. For the purpose of this illustration, each integer 30 may represent a word in a string of characters composed of one or more words (which collectively would be the item 8 stored in memory 20). The integer 30 is built from a combination (e.g. concatenation) of a location 32 where the corresponding string has been stored in memory 20, an offset 34 for finding the word within the string, and a length 36 for extracting all characters from the string that make up the word. Also shown in FIG. 4 is another data component 38, which can encode any other feature associated with the word. For example, as shown below, the other data component 38 can be used to encode a bias for the word to enable multiple words to be sorted more intelligently (e.g. as opposed to simply alphabetically). The integer 30 is stored in the computing device 4 or mobile device 10 as herein exemplified, as a binary sequence and it has been found that 32 or 64 bit integers 30 are able to encode the data described herein.

Figure 5A:
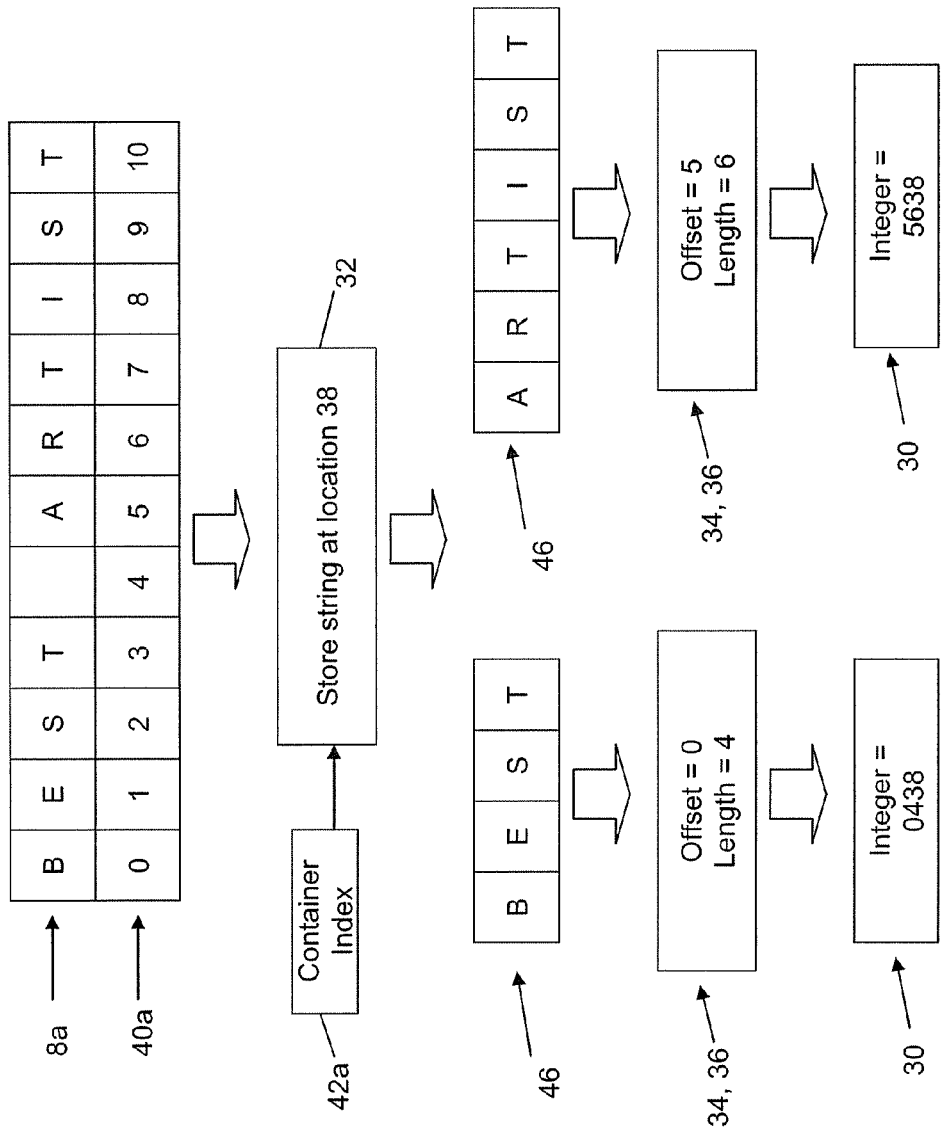
FIGS. 5A and 5B are flow diagrams illustrating the generation of integers according to the structure shown in FIG. 4 for example strings.
Figure 5B:
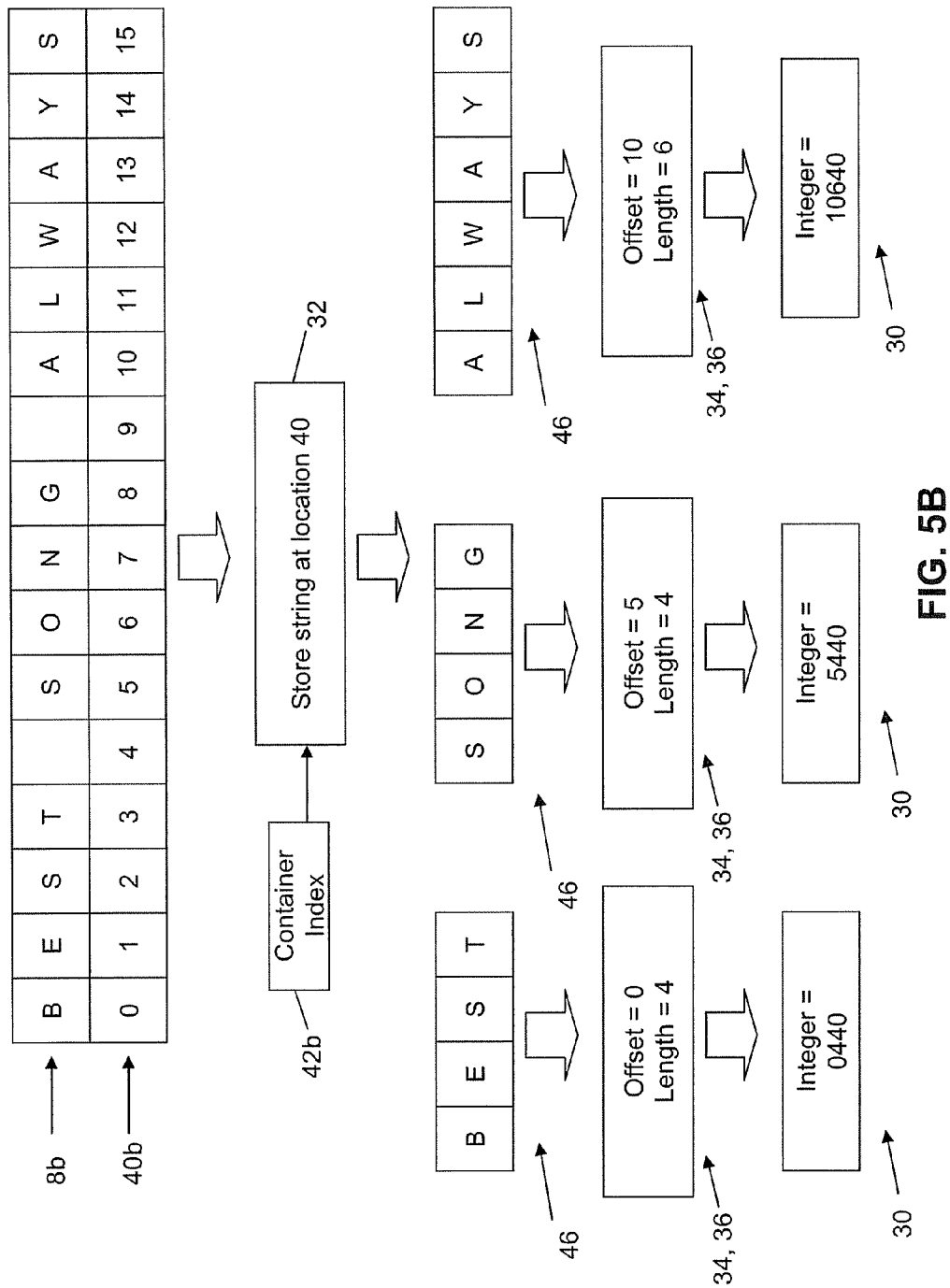

To illustrate how to build an integer 30 using the structure shown in FIG. 4, reference may now be made to FIGS. 5A and 5B. In FIG. 5A, a first string 8a: "Best Artist" is stored in memory 20 and is an attribute of a song object, namely the artist for that song. As can be seen in FIG. 5A, the first string 8a is composed of two words 46, "Best" and "Artist, with a space as a delimiter. Each character in the string 8a is associated with a bit location 40a to enable the offset 34 for that word 46 (in this example beginning at zero from the leftmost character) to be determined. The string 8a is stored in this example at location "38" which is determined based on a container index 42a which is incremented each time a new string 8 is added to the container (e.g. memory 20). An integer 30 for each word 46 is then generated. In this example, "Best" has a zero offset and is 4 characters long. Since the string 8a is stored at index 38, the integer 30 for "Best" is 0438, i.e. by concatenating the individual values as follows: offset||length||location. It can be appreciated that the integer 30 may be built by concatenating in a different order or may be generated according to some other mathematical function so long as it can be consistently applied to each component of an attribute for an object and is unique. It can also be seen that "Artist" has an offset 34 of 5 and is 6 characters in length 36 and, since the string 8a is stored at index 38, the integer 30 for "Artist" would be 5638. The integers 0438 and 5638 may then be stored in appropriate leaf nodes in the tree mapping as will be explained in greater detail below.

It may be noted that by generating and storing only integers, the entire tree can be stored in a vector of integers, thus not requiring the overhead of instantiating a new object to act as a "container node". This can lead to significant space efficiencies.

FIG. 5B illustrates a second string 8b, namely "Best Song Always", which in this example is another attribute of the song object (from FIG. 5A), i.e. the title. Therefore, it can be seen that multiple attributes can be associated with the same object. The container index 42b for the second string 8b indicates that the song title is stored at index 40. Given the bit numbering 40b, it can be seen in FIG. 5B that the words 46: "Best", "Song", and "Always"; are given integers 30: "0440", "5440", and "10640" respectively. Therefore, in this example, 5 integers 30 need to be stored in the tree mapping 24 to enable the strings 8a and 8b to be found and the words 46 within those strings 8a, 8b to be located and extracted if desired.

Figure 6:
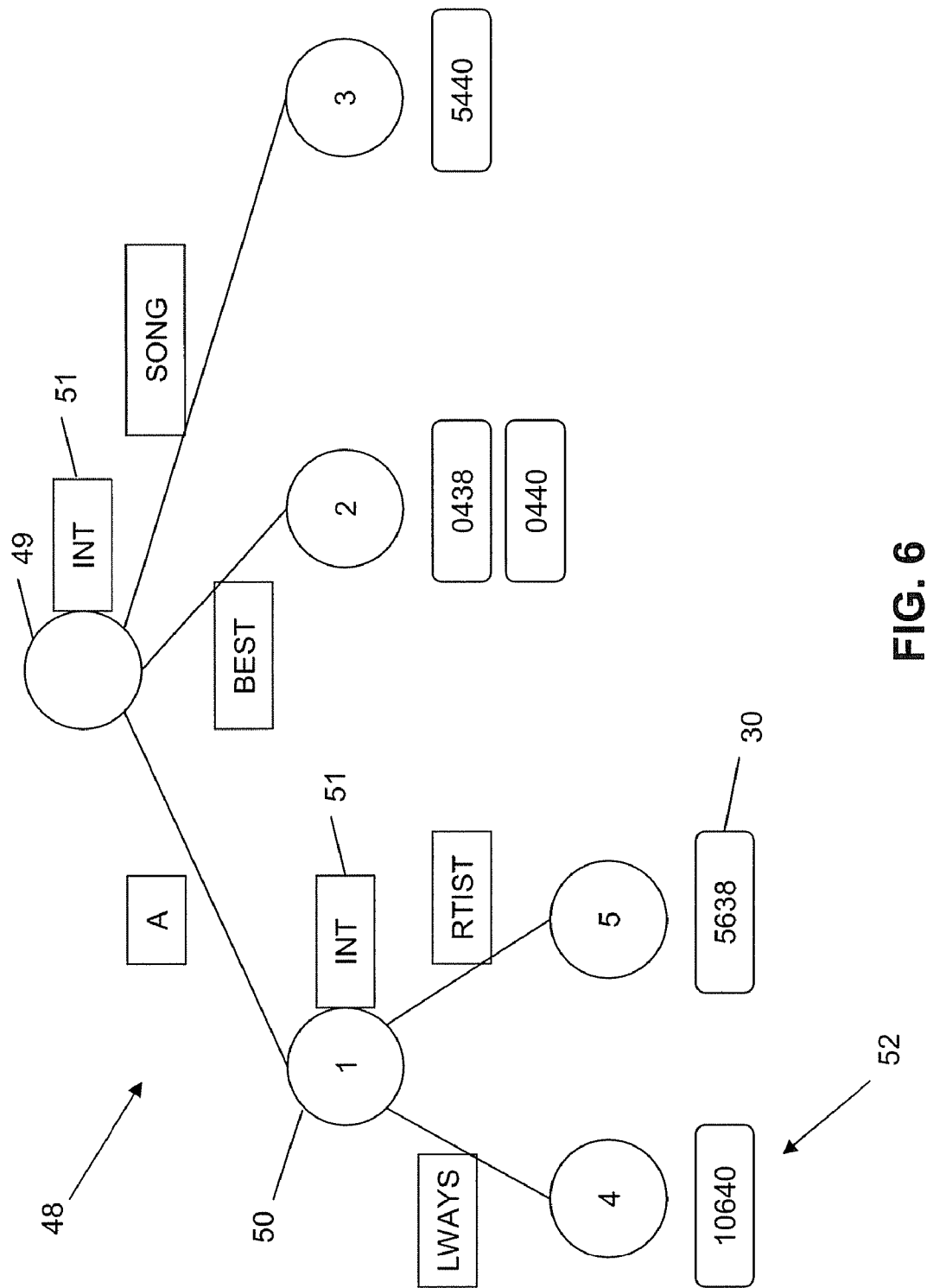
FIG. 6 is a schematic diagram illustrating an example Patricia tree storing the integers generated in FIGS. 5A and 5B.
Figure 8:
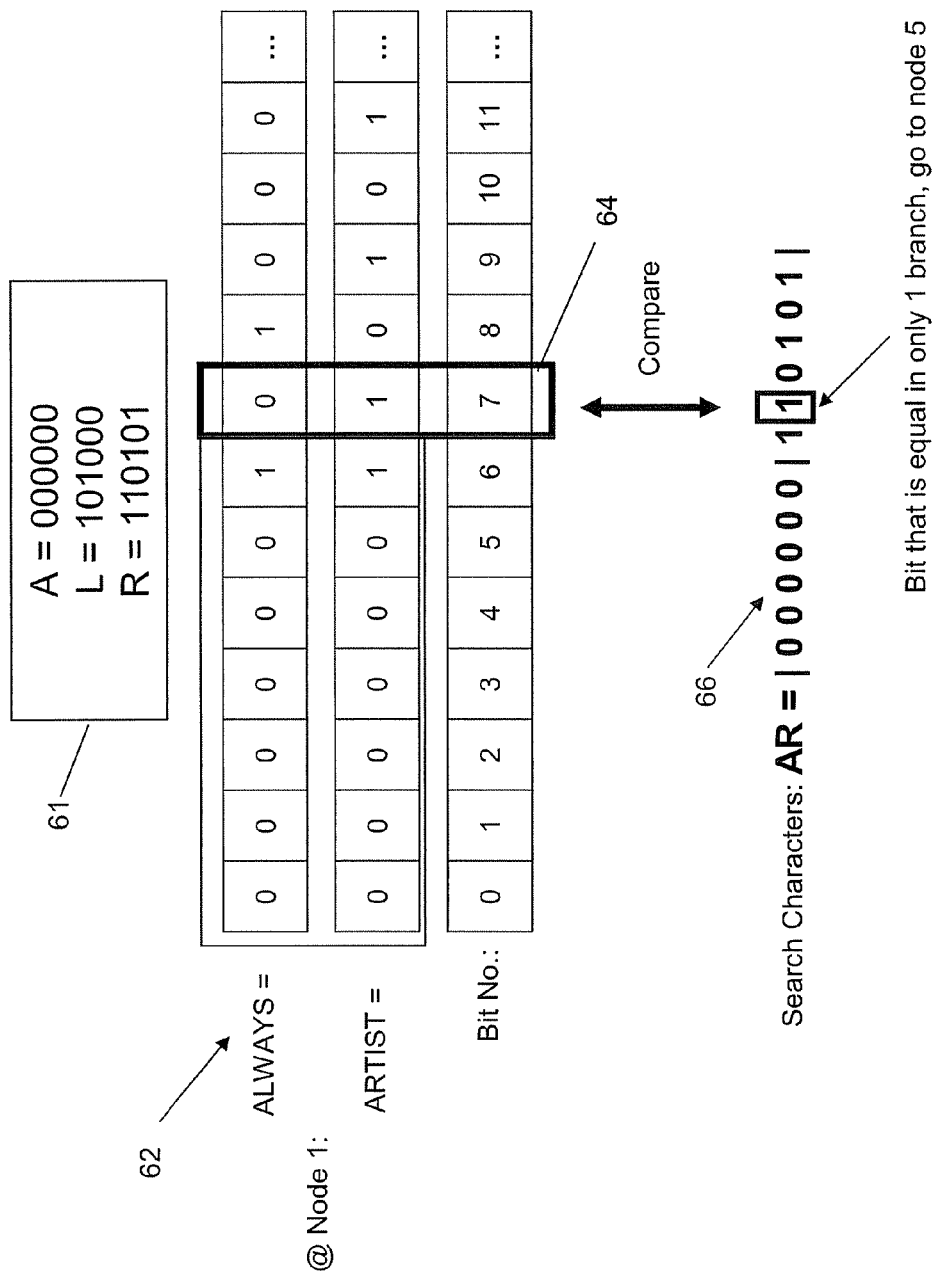
FIG. 8 is a schematic diagram illustrating an example bit-by-bit comparison of search character inputs to branches in a tree.

Since the integers 30 are associated with words 46, there are situations, such as this example, where more than one integer 30 is associated with the same word 46 and, in the context of a tree mapping 24, the same leaf node 52. In FIGS. 5A and 5B, two integers are generated for "Best" and since each integer 30 is unique, by searching for "Best", two integers 30 and thus two strings 8 would be located. Turning now to FIG. 6, a tree 48 is shown schematically assuming that only the 5 integers from FIGS. 5A and 5B are included. The tree 48 includes an internal node 50 for each branching, and contains a leaf node 52 for each complete word 46. In this way, each integer 30 for that word 46 is stored at the leaf node 52 and, each leaf node 52 will contain at least one integer 30. As can also be seen in FIG. 6, each non-leaf or "inner" node (including the internal nodes 50 and the root node 49) may also store an inner node integer 51, which encodes information to facilitate traversal of the tree 48. For example, the inner node integer 51 may encode the bit number to compare in order to determine which way to branch for a given search. The nodes 49, 50 are typically stored in a separate array of integers, similar to the leaf nodes 52. To illustrate, assume that the character "AR" is used in a lookup as shown in FIG. 8. There is a bit sequence 66 for this series of characters that would be compared 64 against the bit sequences 62 for words represented in the tree 48. At node 1, in this example, the inner node integer 51 would indicate that the bit to compare is the eighth bit along the sequence. Therefore, when examining the eighth bit in the sequence 66 for "AR", it is determined that it is a "1" and thus the "RTIST" edge is taken. This avoids having to examine the first through $7^{th}$ bits thus increasing the efficiency. The inner node integer 51 may also encode the number of left nodes which, e.g.: [rootNode, leftNode, leftNode, leftNode, rightNode, rightNode, rightNode, rightNode]. The number of leftNodes a node has is used so that when you are at a node and do a comparison, you skip all the left nodes (if you need to branch right) or just go on to the next node (if you branch left), which is commonly referred to in the art as an implicit data structure.

Figure 7A:
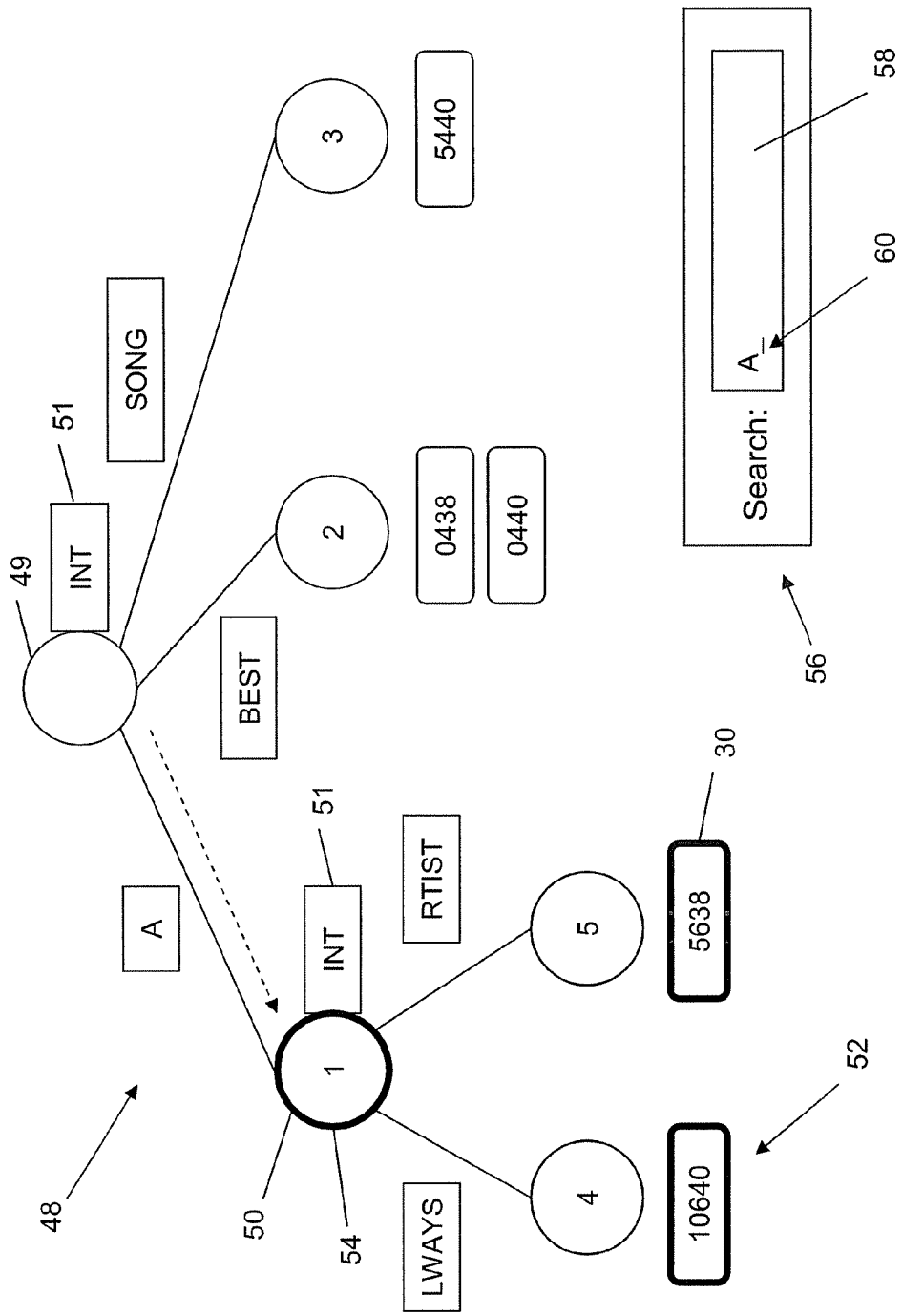
FIGS. 7A and 7B are example searches performed using the tree shown in FIG. 6.
Figure 7B:
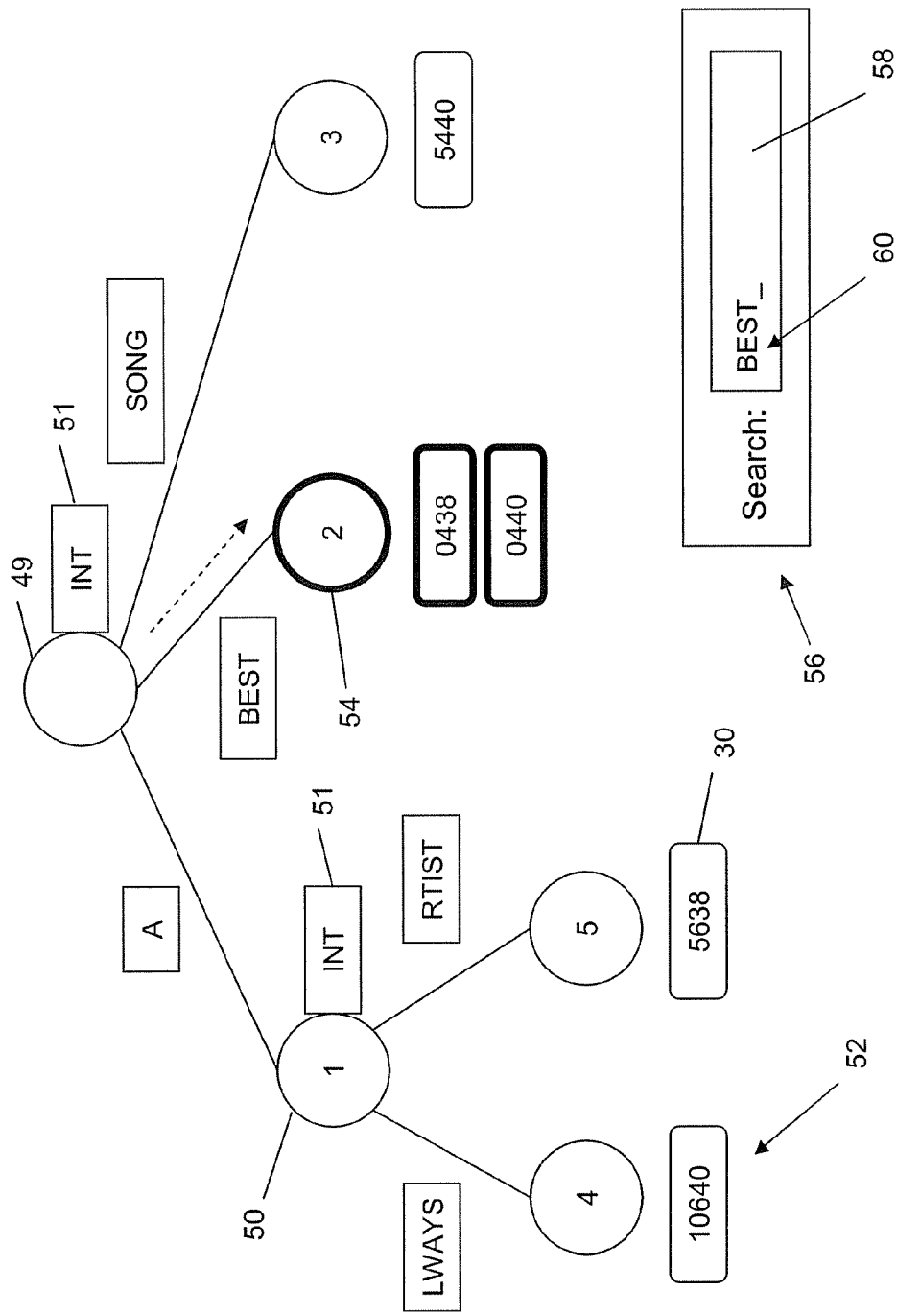

FIGS. 7A and 7B illustrate two example searches using the tree 48 shown in FIG. 6. In both figures, a search tool 56 is shown which enables entry of a series of characters as a search input 60 in an input box 58. Such search tools 56 are well known in the art and can be included in any suitable application that requires a search. The search illustrated in FIG. 7A uses the input "A" to traverse the tree 48. At the root node 49, it would be determined that the "A" should be taken given a comparison of the binary sequence for "A" when compared to those options at the edges. This would take the search to node 1, however, since the search input 60 only contains "A", the search would simply terminate at node 1 and return all integers 30 beneath node 1. In this example, integers 10640 and 5638 would be returned. The search illustrated in FIG. 7B uses the input 60: "BEST"; to traverse the tree 48. In this example, the binary sequence for the input 60 would match the binary sequence for the edge "BEST" and thus the search would terminate at node 2 and all integers below node 2 would be returned. In this case, node 2 is also a leaf node 52 and includes two integers, 0438 and 0440, which would both be returned. As can be seen, a search for the word "BEST" returns two different unique integers thus indicating that two different attributes contain that word 46. Consequently, the search would return two attributes. It may be noted that the two attributes may still refer to the same object (e.g. song).

Turning now to FIGS. 9A, 9B, 10A, and 10B, once the integers 30 are found in the tree mapping 24, binary masks 72, 74, 76 are applied to the binary sequences 70 for the integers 30 to determine the location 32 of the string, the offset 34, and then the length 36 to identify and if desired, extract the word 46 within the string. The masks 72-76 use knowledge of where within the integer the desired information is encoded to focus only on the bits that correspond to that information. FIG. 9A illustrates various masking operations performed on the integer "10640". A location mask 72 is first applied to the binary sequence 70, which reveals "101000", which corresponds to the index "40". If the string stored at this index is to simply be returned, no further masking is required and the string "Best Song Always" can be included in search results. However, in this example, it is desired to highlight the word 46 within the string 8 that caused that string 8 to be part of the results. Therefore, an offset mask 74 is applied revealing "1010", which indicates that the word 46 associated with integer "10640" is ten bits from the left. Finally, a length mask 76 is applied revealing "110" thus indicating that the word 46 associated with integer "10640" is six bits in length. From this, the six characters beginning at the tenth bit from the left of the string are highlighted as shown in FIG. 9A. FIG. 9B proceeds in a similar fashion for the integer "5638" and it can be seen that by applying the corresponding masks 72, 74, 76, the string "Best Artist" is returned and the "Artist" is highlighted, e.g. in bold font. In this way, the by inputting "A" as shown in FIG. 7A, the two returned integers find the two strings and highlight the words in those strings that contain the character "A".

FIGS. 10A and 10B illustrate similar masking operations performed on the integers 30 found in the second search shown in FIG. 7B. In this case, the same strings are returned, but different words 46, namely "BEST" are highlighted to show how those strings came to be included in the search results.

FIGS. 11A and 11B illustrate example screen shots 80 of a Music Library Search tool 56', which uses the principles shown in FIGS. 4 through 10 to return a list 82 of search results as the user types in a search input 60' in an input box 58'. FIG. 11A illustrates graphically the search results from the search shown in FIG. 7A while FIG. 11B illustrates graphically the search results from the search shown in FIG. 7B.

Figure 12A:
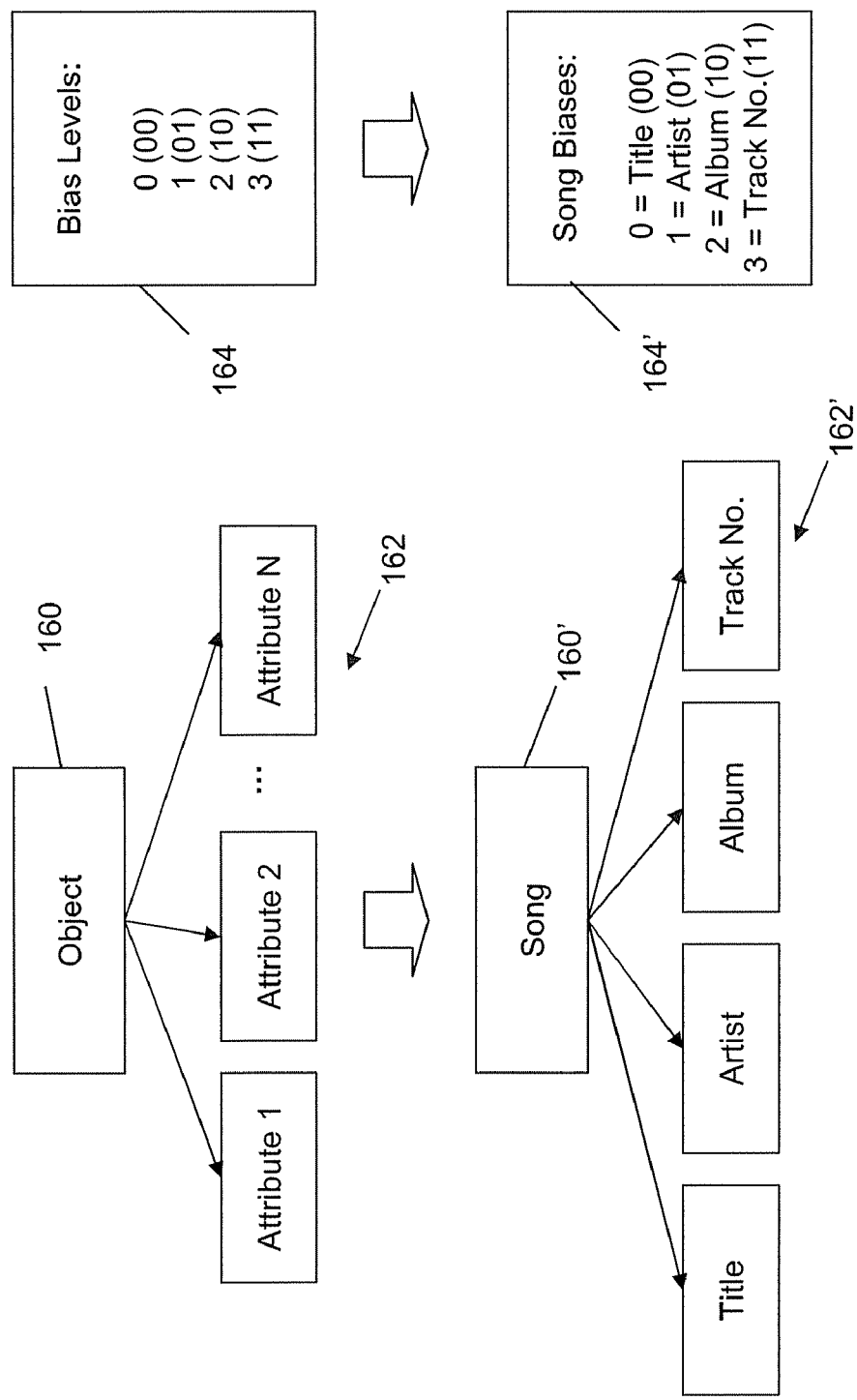
FIGS. 12A and 12B are flow diagrams illustrating the introduction of a bias into integers for organizing search results in a list.

Turning now to FIG. 12A, as noted above, an object 160 that is stored in the memory 20 can have multiple searchable attributes 162. When returning search results, often certain attributes should take precedence, especially in a long list of results, to minimize the amount of scrolling to find the desired result. For example, if searching for music, if song titles are more often queried than the artist, the titles that contain the returned word 46 should be listed above the artist. In another example, when searching for a contact from a contact list, searches that include names for selected contacts should likely be listed above locations or company names. In situations where such ordering of search results is desired, a bias level 164 can be encoded into the integer 30. For ease of illustration, 4 bias levels are used in this example, namely 0, 1, 2, and 3 having binary representations "00", "01", "10", and "11" respectively. In the example shown in FIG. 12A, a song object 160' may have associated with it, title, artist, album, and track number attributes 162'. Bias levels 164' can be assigned as shown to bias titles first, then artists, then albums, then track numbers.

Figure 12B:
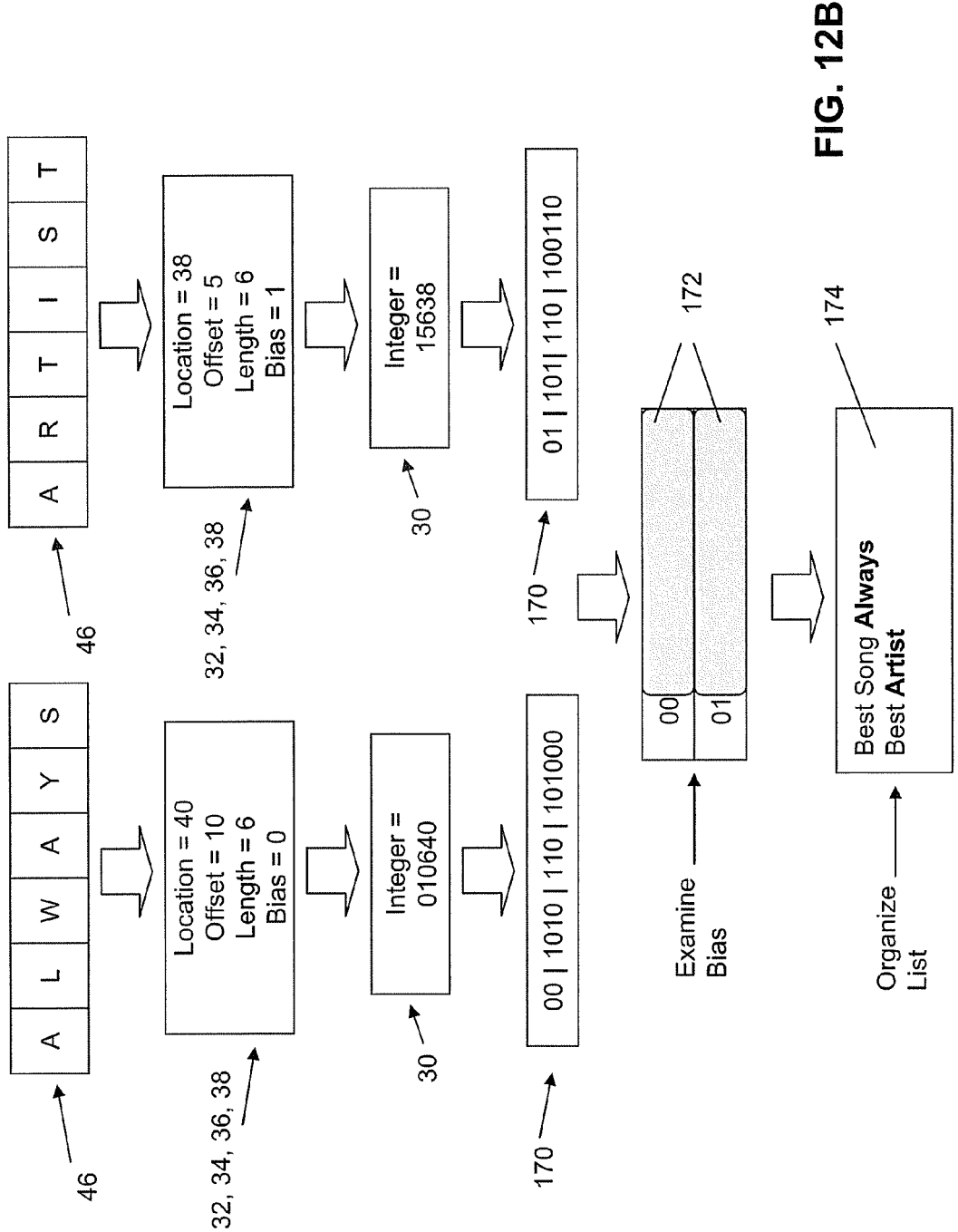

FIG. 12B illustrates how a bias level 164 can be included in the generation of an integer 30. In this example, the words "Always" and "Artist" are shown and it is assumed that they are returned in a search result. For "Always", the same data is determined as before but the highest bias level, namely zero (0) is applied since "Always" is in a song title. For "Artist", a bias level 1 is given since it is part of an artist name. The integers 30 are thus encoded with the bias level at the front as shown. This modifies the binary sequences 170 with a two bit representation at the front. A bias mask 172 can then be applied to these sequences 170, e.g. when the two integers 30 are found in a search, and a search result list 174 can be organized or ordered with the string containing "Always" first, followed by the string containing "Artist".

Although the bias levels 174 shown herein are pre-assigned, in other embodiments (not shown), the bias levels can be assigned and updated dynamically according to user preferences, or by a sorting mechanism. For example, a search results list 174 may be returned in the order in which the integers 30 are found and then sorted by detecting selection of a sorting option in the user interface (not shown). Alternatively, or in addition to such a feature, the user may be presented with preferences for sorting which enables them to assign bias levels to different types of objects. For example, nicknames could be given a higher bias for contacts or buddy lists when compared to names of co-workers in a global address list. It can therefore be appreciated that the bias levels 164 can encode any preference for ordering. Also, the bias levels 164 can be pre-assigned (defaults), can be assigned by the user based on a particular metric (e.g. by querying user), or can be assigned dynamically (e.g. based on what the user clicks on most often in the list).

Turning now to FIG. 13, a set of computer executable instructions is shown for generating a new integer 30 for a new item 8 that is being stored or has been stored in memory 20, and then adding the integer 30 to the tree mapping 24. In this example, a string with one or more words is used, however, the principles also apply to any item 8 having one or more components. At 200, the container index 42 is referenced and the string 8 is stored in memory 20 at the indexed location at 202. The container index 42 would then be incremented so that the next string 8 would be stored at a unique location. The string 8 is then examined at 206 to identify a word 46 in the string 8 to which the integer 30 will be associated. Once a word 46 has been identified, the offset 34 and length 36 are determined at 208 and the location of the string 8, the offset of the word 46 and the length 36 of the word 46 are combined to generate the integer at 210. At 212, it is then determined if a bias level 164 is to be encoded. If not, the integer 30 is added to the tree 48 at 216. If a bias level 164 is to be encoded, the bias level 164 is assigned (e.g. according to rules, instructions, or preferences) and the bias is added to the integer 30 at 214. The integer 30 is added to the tree 48 by traversing the tree according to the characters in the word 46 until an existing leaf node 52 having that word 46 is found or a new leaf node 52 is created for that word 46. In a Patricia tree implementation, the tree 48 may be modified if any inner nodes have only one child as is well known in the art. Once the integer 30 has been added to the tree 48, it is determined at 218 whether or not more words 46 exist in the string 8. If so, step 206 is repeated and new integers 30 are generated and stored until all words 46 in the string 8 are stored. Once this occurs, the process ends at 220.

Figure 14:
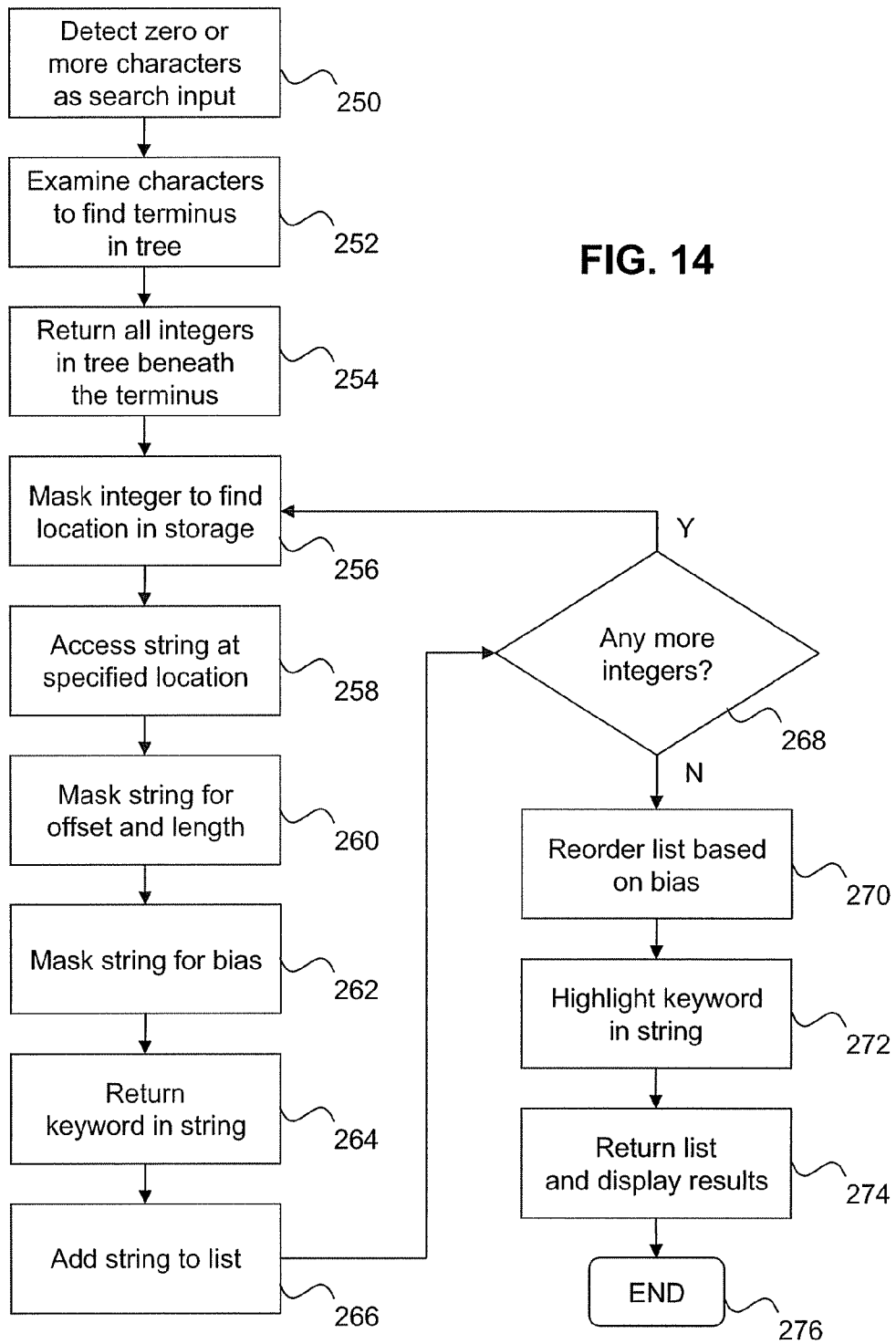
FIG. 14 is a flow diagram illustrating an example set of computer executable instructions for searching, finding, organizing, and displaying a list of search results using the tree mapping 24 shown in FIG. 3.

To find strings 8 stored in memory 20 for generating a search result list 174, the computer executable instructions shown in FIG. 14 may be implemented. At 250, a search input 60 is detected, which may comprise zero or more characters. For example, in some embodiments, by typing in no characters, the entire list may be returned and then further filtered as additional characters are entered. At 252, the characters in the search input 60 are examined to find a terminus in the tree 48. This is done by examining bits in the characters according to information encoded in the inner node integers 51 for example, and following the requisite branches in the tree 48. Once the terminus is found at 254, at least one integer 30 will be returned. The integer 30 is masked to find the location 32 so that the string 8 can be accessed from memory 20. In this example, further masking is performed at 258, 260, and 262 to determine where in the string 8 the associated word 46 is, which characters it consumes, and then a bias level 164. It will be appreciated however that if a simple list is to be returned without any sorting or identification of which word caused the string 8 to be included, then only the masking at 256 is required. When the string 8 itself is masked, the keyword 46 in the string 8 is then returned at 264 and the string 8 is added to the search list 174 at 266. It is then determined at 268 whether or not any more integers 30 were returned. If so, the additional integers 30 are masked etc. in the same manner as the first integer 30. Once all strings 8 associated with the integers 30 have been found, the list in this example is reordered or sorted based on the biases at 270 and the keywords 46 found in the strings 8 are highlighted at 272. The list may then be returned and displayed at 274 as the sorted search results. The process then ends at 276.

Figure 15:
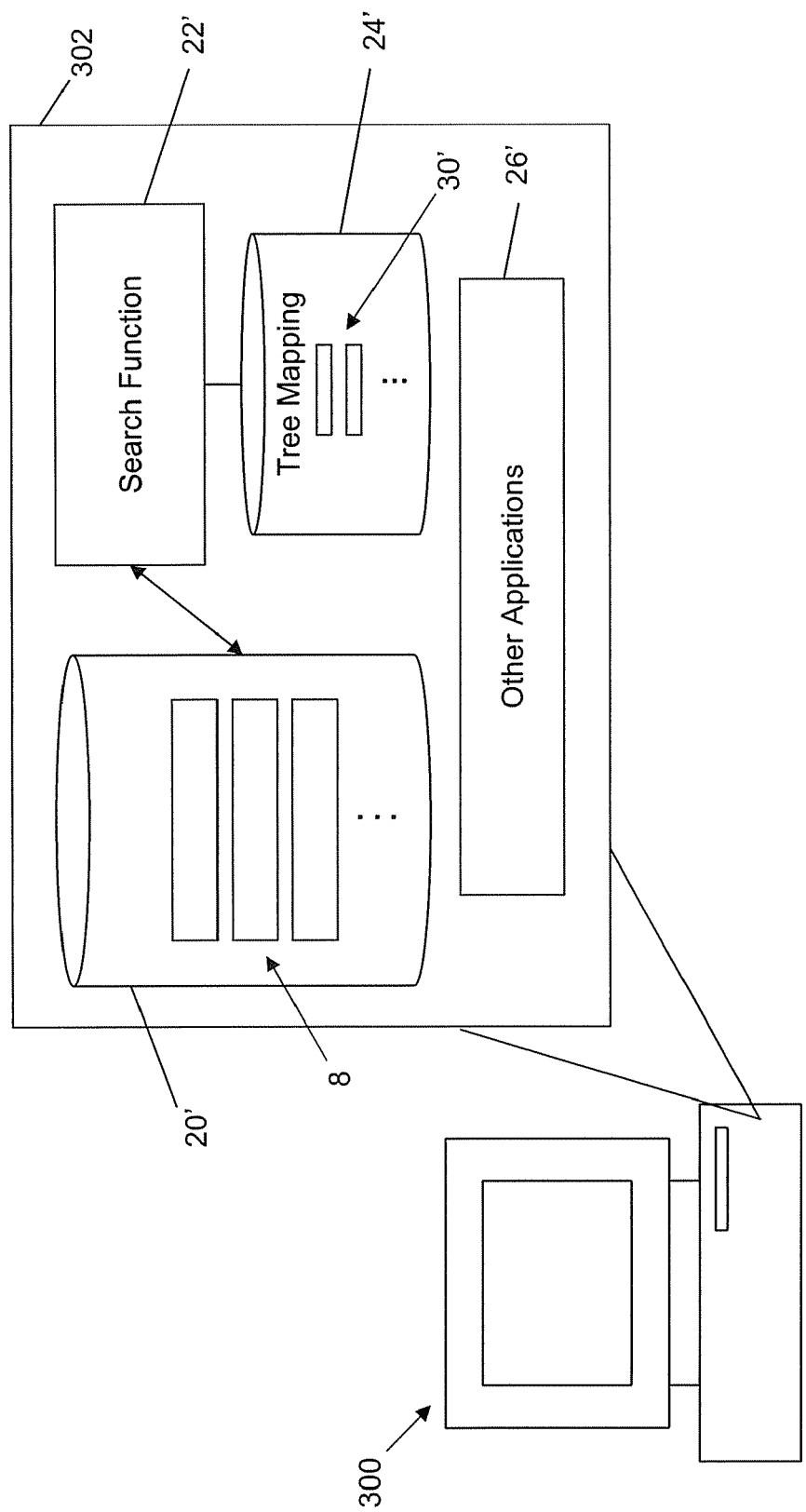
FIG. 15 is a block diagram illustrating another embodiment of the configuration shown in FIG. 3 in a personal computer.

FIG. 15 illustrates that the principles discussed above, can be applied to any computing device and should not be limited to only mobile devices 10. A personal computer 300 is shown in FIG. 15, which includes software 302 or other computer executable instructions and data to include the same modules and functionality as the other software components 139 shown in FIG. 3. It can therefore be appreciated that any computing device 4 may utilize the integer structure shown in FIG. 4 to create a tree mapping 24 to store and find items 8 in memory 20.

Although the above has been described with reference to certain specific embodiments, various modifications thereof will be apparent to those skilled in the art without departing from the scope of the claims appended hereto.

The invention claimed is:

1. A computer implemented method of generating a tree for finding items stored in memory, said method comprising:
    determining a first value indicative of a location in a memory where an item is stored;
    determining a second value indicative of a bias level for said item, said bias level for performing a sorting operation on a search result list comprising said item;
    determining a third value indicative of an offset within said item where a component of said item begins;
    determining a fourth value indicative of a length of said component within said item to enable said component to be found;
    including said first value, said second value, said third value, and said fourth value in generating an integer representing said component of said item, said first value, said second value, said third value, and said fourth value being determinable from said integer;
    and
    storing said integer at a node in a tree according to characters associated with said item, said tree being searchable based on said characters.

2. The method according to claim 1, wherein said generating comprises combining said first, second, third, and fourth values.

3. The method according to claim 2, wherein said combining comprises concatenating said first, second, third, and fourth values.

4. The method according to claim 1, wherein said location in said memory is unique, and wherein said method further comprises incrementing a counter to provide a next location for a next item to be stored.

5. The method according to claim 1, wherein said characters are associated with an attribute of said item.

6. The method according to claim 1, wherein said tree utilizes a Patricia tree format.

7. The method according to claim 1, wherein said memory is located in a mobile device.

8. A computer implemented method of retrieving items stored in memory, said method comprising:
obtaining zero or more characters as a search input;
examining said search input and traversing a tree built from one or more items each having at least one integer associated therewith, each integer representing a component of a respective item and having been generated using a first value indicative of a location where said item can be found in a memory, a second value indicative of a bias level for said item, a third value indicative of an offset within said item where said component begins, and a fourth value indicative of a length of said component within said item to enable said component to be found;
upon reaching a terminus in said tree according to said zero or more characters, returning all integers stored at one or more leaf nodes beneath said terminus in said tree;
for each integer, determining from said integer, said first value indicative of said location and said second value indicative of said bias level, accessing said item in said memory at said location, determining said third and fourth values, finding said component in said item using said third value, extracting said component according to said fourth value, and returning said component and its bias level for a list of search results;
sorting said list of search results using bias levels from said at least one integer; and
providing said list of search results.

9. The method according to claim 8, wherein said determining by masking said integer to extract respective ones of said first, second, third, and fourth values.

10. The method according to claim 8, further comprising highlighting said component in said item in said list of search results.

11. The method according to claim 8, wherein said tree utilizes a Patricia tree format.

12. The method according to claim 8, wherein said memory is located in a mobile device.

13. A non-transitory computer readable medium comprising computer executable instructions for generating a tree for finding items stored in memory, said computer executable instructions comprising instructions for:
determining a first value indicative of a location in a memory where an item is stored;
determining a second value indicative of a bias level for said item, said bias level for performing a sorting operation on a search result list comprising said item;
determining a third value indicative of an offset within said item where a component of said item begins;
determining a fourth value indicative of a length of said component within said item to enable said component to be found;
including said first value, said second value, said third value, and said fourth value in generating an integer representing said component of said item, said first value, said second value, said third value, and said fourth value being determinable from said integer; and
storing said integer at a node in a tree according to characters associated with said item, said tree being searchable based on said characters.

14. The non-transitory computer readable medium according to claim 13 wherein said generating comprises combining said first, second, third, and fourth values.

15. The non-transitory computer readable medium according to claim 14, wherein said combining comprises concatenating said first, second, third, and fourth values.

16. The non-transitory computer readable medium according to claim 13, wherein said location in said memory is unique, and wherein said computer readable medium further comprises instructions for incrementing a counter to provide a next location for a next item to be stored.

17. The non-transitory computer readable medium according to claim 13, wherein said characters are associated with an attribute of said item.

18. The non-transitory computer readable medium according to claim 13, wherein said tree utilizes a Patricia tree format.

19. The non-transitory computer readable medium according to claim 13, wherein said memory is located in a mobile device.

20. A non-transitory computer readable medium comprising computer executable instructions for retrieving items stored in memory, said computer readable medium comprising instructions for:
obtaining zero or more characters as a search input;
examining said search input and traversing a tree built from one or more items each having at least one integer associated therewith, each integer representing a component of a respective item and having been generated using a first value indicative of a location where said item can be found in a memory, a second value indicative of a bias level for said item, a third value indicative of an offset within said item where said component begins, and a fourth value indicative of a length of said component within said item to enable said component to be found;
upon reaching a terminus in said tree according to said zero or more characters, returning all integers stored at one or more leaf nodes beneath said terminus in said tree;
for each integer, determining from said integer, said first value indicative of said location and said second value indicative of said bias level, accessing said item in said memory at said location, determining said third and fourth values, finding said component in said item using said third value, extracting said component according to said fourth value, and returning said component and its bias level for a list of search results;
sorting said list of search results using bias levels from said at least one integer; and
providing said list of search results.

21. The non-transitory computer readable medium according to claim 20, wherein said values are determined by masking said integer to extract respective ones of said first, second, third, and fourth values.

22. The non-transitory computer readable medium according to claim 20, further comprising instructions for highlighting said component in said item in said list of search results.

23. The non-transitory computer readable medium according to claim 20, wherein said tree utilizes a Patricia tree format.

24. The non-transitory computer readable medium according to claim 20, wherein said memory is located in a mobile device.

25. A mobile device comprising a processor and memory, said processor being operable for generating a tree for finding items stored in said memory by:
- determining a first value indicative of a location in a memory where an item is stored;
- determining a second value indicative of a bias level for said item, said bias level for performing a sorting operation on a search result list comprising said item;
- determining a third value indicative of an offset within said item where a component of said item begins;
- determining a fourth value indicative of a length of said component within said item to enable said component to be found;
- including said first value, said second value, said third value, and said fourth value in generating an integer representing said component of said item, said first value, said second value, said third value, and said fourth value being determinable from said integer; and
- storing said integer at a node in a tree according to characters associated with said item, said tree being searchable based on said characters.

26. A mobile device comprising a processor and memory, said processor being operable for retrieving items stored in memory by:
- obtaining zero or more characters as a search input;
- examining said search input and traversing a tree built from one or more items each having at least one integer associated therewith, each integer representing a component of a respective item and having been generated using a first value indicative of a location where said item can be found in a memory, a second value indicative of a bias level for said item, a third value indicative of an offset within said item where said component begins, and a fourth value indicative of a length of said component within said item to enable said component to be found;
- upon reaching a terminus in said tree according to said zero or more characters, returning all integers stored at one or more leaf nodes beneath said terminus in said tree;
- for each integer, determining from said integer, said first value indicative of said location and said second value indicative of said bias level, accessing said item in said memory at said location, determining said third and fourth values, finding said component in said item using said third value, extracting said component according to said fourth value, and returning said component and its bias level for a list of search results;
- sorting said list of search results using bias levels from said at least one integer; and
- providing said list of search results.

* * * * *